Figure 1:
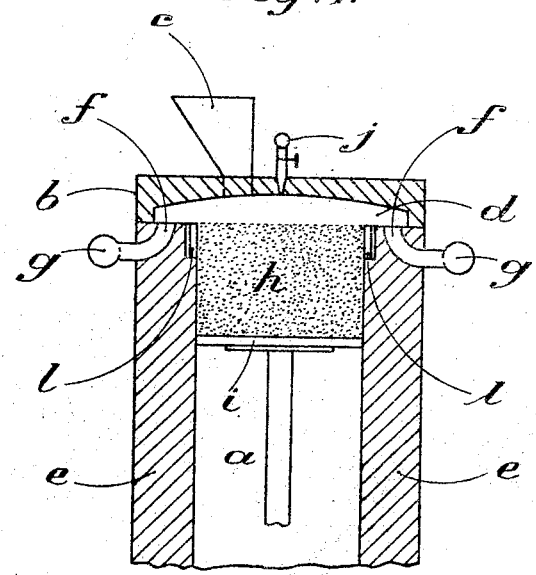

April 20, 1926.  1,581,397
X. DE SPIRLET
PROCESS AND APPARATUS FOR THE COMBUSTION, THE REDUCTION, OR THE
TREATMENT OF SOLID MATERIAL OR OF PULVERIZED MINERALS
Filed Oct. 2, 1924

Inventor
Xavier de Spirlet
By B. Singer. Atty.

Patented Apr. 20, 1926.

1,581,397

UNITED STATES PATENT OFFICE.

XAVIER DE SPIRLET, OF BRUSSELS, BELGIUM.

PROCESS AND APPARATUS FOR THE COMBUSTION, THE REDUCTION, OR THE TREATMENT OF SOLID MATERIAL OR OF PULVERIZED MINERALS.

Application filed October 2, 1924. Serial No. 741,296.

*To all whom it may concern:*

Be it known that I, XAVIER DE SPIRLET, 39 Rue Gerard, Brussels, Belgium, have invented new and useful Processes and Apparatus for the Combustion, the Reduction, or the Treatment of Solid Material or of Pulverized Minerals, of which the following is a specification.

The invention consists in carrying out the combustion, the reduction or the treatment of solid material or of minerals in the pulverized state by bringing a thin constantly-renewed layer of the latter in intimate contact with a suitable stream of gas so as to cause certain elements to react chemically.

In particular, the invention provides for the following:

(a) The combination of oxygen with the carbon in coal, for the purpose of afterward using the hot gases produced in boilers, furnaces, etc.

(b) The combination of atmospheric oxygen with sulphide minerals (zinc blende, pyrites, galena etc.) for the purpose of roasting these minerals with the production of sulphur dioxide and trioxide and using the gases for making sulphuric acid or for any other purpose.

The processes used at present consist in causing the air to enter by the bottom of the apparatus and the solid material by the top as in gas producers, roasting furnaces etc. and in removing the solid products from the bottom, the gases passing through the mass of solid material or coming in contact with the latter spread in thin layers on shelves one above the other. The cleaning of the ovens, producers etc. where coal is burned and the removal of the residue from roasting sulphide minerals is effected from the bottom.

The process according to the present invention consists in bringing the finely divided mass of solid material upward into contact with the air in a suitable combustion chamber and in removing the solid products after reaction so as to uncover a fresh surface of contact between the solid matter and the atmospheric oxygen.

In order to obtain this result the solid matter, consisting of finely divided coal or sulphide mineral, is charged into a suitable cylindrical or rectangular prismatic recipient, the movable bottom of which is formed by a heavy plate which can be raised slowly, either continuously or intermittently, and lowered rapidly.

The upward motion is regulated so as to bring a layer of solid matter, of a predetermined thickness into the upper part of the recipient in contact with the air or suitable gas, in a predetermined time. A raking mechanism, operating with a rotary motion in the case of a cylindrical recipient or with a reciprocating motion in the case of a rectangular recipient, and adjusted according to the results to be obtained so as to move continuously or intermittently, removes a thin layer of solid matter which has reacted, and uncovers a fresh contact surface either continuously or at each stroke.

The solid matter is pushed into suitable bins and the gases are removed through conduits.

When the plate has reached the top of its stroke it is rapidly lowered and a fresh charge is placed in the apparatus by a single operation of a charging device. A few quick movements of the raking mechanism level off the contact surface and the apparatus is ready to take up its normal operation again. The charging can be arranged so that fresh material is fed into the apparatus beneath the contact surface without breaking up the latter.

For the purpose of using the air completely and especially in the case of the combustion of sulphur, the height of the combustion chamber may be reduced after each stroke of the mechanism raking the layer of oxidized material, by lowering the roof, the latter movement being mechanically combined with that of the rake. The raising and lowering of the combustion or reaction chamber roof may be made possible by providing the latter with a dust proof joint thus rendering it independent of the rest of the furnace. The rake guides may be air or water cooled. The air for combustion may be brought under a slight pressure through orifices on the roof or through a grate buried in the mass of solid material at a predetermined depth. This air may be preheated to direct or indirect contact with the solid residue pushed into the bin.

For example, the advantages of the process, in the case of the combustion of coal, consists in:

(1) Obtaining a complete combustion of the coal, the reduction of carbon dioxide to carbon monoxide not being able to occur.

(2) Always having a regular combustion, constantly of the same intensity.

(3) Reducing the harmful effect of the cinders.

(4) Doing away with manual labor for charging or cleaning the ovens.

In the case of combustion of sulphur, they consist in:

(1) Obtaining a complete and rapid combustion of sulphur in contact with oxygen in a high temperature combustion chamber.

(2) Avoiding the formation of lumps, raking being effected as often as necessary.

(3) To have a very regular combustion easily regulable.

(4) Doing away with all manual labor in the furnace, which has no part likely to be worn or to deteriorate rapidly.

(5) Doing away with all coal consumption by concentrating the chemical reactions, provided that the quantity of sulphur is sufficient to raise the mass of material to a reacting temperature.

Figure 2:
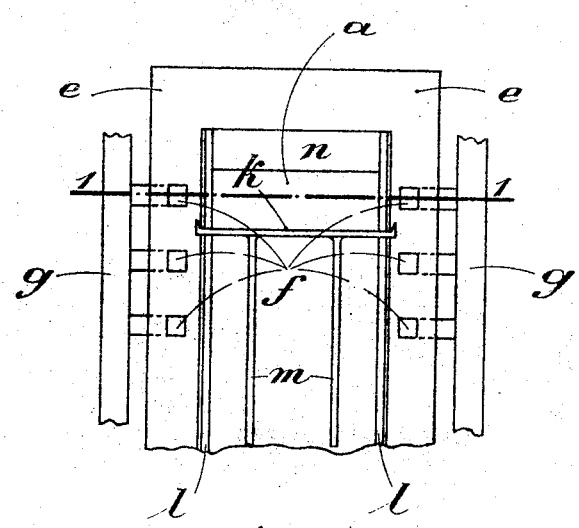

By way of example a diagrammatic arrangement of an apparatus suitable for carrying out the process is shown on the attached drawing, in which:

Figure 1 is a vertical section of the apparatus taken on the line 1—1 of Figure 2, while Figure 2 is a plan looking from above, the cover being removed.

In the two figures, $a$ designates a rectangular prismatic recipient with movable covering $b$ forming a roof and provided with a charging hopper $c$. A combustion or reaction chamber $d$ is formed by the roof above the recipient $a$. In the walls $e$ of the recipient $a$ below the said roof are provided the outlet orifices $f$ for the combustion or reaction gases which flow away through the headers $g$.

The recipient $a$ is filled with pulverized combustible or mineral $h$. A piston $i$ forming a movable bottom for the said recipient enables the material $h$ to be raised intermittently a short distance, so that a thin layer of material, the thickness of which may be regulated, is made to project above the edges of the recipient $a$ into the combustion chamber formed by the roof.

The piping $j$ conducts the air and distributes it over the thin layer of material projecting into the combustion chamber.

A rake $k$ sliding in guides $l$ provided on each longitudinal edge of the recipient $a$ and which can be moved intermittently with a reciprocating motion by means of the mechanically operated rods $m$, enables the burned, roasted or oxidized layer of material to be removed and pushed into the bin $n$.

The guides $l$ may be cooled by any suitable means. After each raking operation, the rake $k$ is brought back into a relatively cool space in the furnace provided specially, for this purpose but not shown in the drawings.

What I claim is:

1. A process for burning, oxidizing, reducing, roasting or like treatment of materials such as fuel and ores in pulverulent state, consisting in exposing the surface of material in a thin layer to the action of a gaseous agent, to cause certain elements of the said gaseous agent to react on certain elements of the thin layer of material, renewing such material while thus exposed and also removing the solid pulverulent material which is left after the reaction is finished to ensure continuous working, complete and uniform combustion of the carbon of a fuel or complete combustion of the sulphur of a sulphide ore to be roasted etc., without formation of slag or agglomerations and without having to employ labour for cleaning the combustion or roasting furnace.

2. Apparatus for carrying out the process as claimed in claim 1 including a chamber in which the powdery material is stored, provided with a movable floor, and located in a furnace and arranged to be raised so that the material is exposed in a thin layer to the action of the reagent in a space at the top of the chamber and below a cover, and means to cause the reagent to be supplied to and spread over the said space.

3. Apparatus as claimed in claim 2, comprising a mechanically operated scraper for removing the residual layer of solid material and transferring it to an adjacent silo or storage receptacle, and ducts or conduits for the discharge of the combustion or reaction gases from the treatment chamber or space.

In testimony whereof I affix my signature.

XAVIER de SPIRLET.